United States Patent [19]

Gray

[11] Patent Number: 4,848,540
[45] Date of Patent: Jul. 18, 1989

[54] SKIRT SEAL IMPACT BRACKET

[76] Inventor: Glenn E. Gray, R.F.D. No. 1, Box 202, Tippecanoe, Ohio 44699

[21] Appl. No.: 148,947

[22] Filed: Jan. 27, 1988

[51] Int. Cl.$^4$ .............................................. B65G 15/08
[52] U.S. Cl. .................................... 198/824; 198/813
[58] Field of Search ....................... 198/824, 826, 843; 188/166, 174, 248

[56] References Cited

U.S. PATENT DOCUMENTS

| | | | |
|---|---|---|---|
| 1,707,998 | 4/1929 | Shaw | 198/824 |
| 2,735,536 | 2/1956 | Lorig | 198/824 |
| 2,974,777 | 4/1959 | Marsh | 198/824 X |
| 3,064,796 | 3/1960 | Orwin | 198/824 |
| 3,182,788 | 5/1965 | Donadio et al. | 198/824 |
| 3,295,665 | 11/1964 | Bitzer | 198/824 |

Primary Examiner—Robert J. Spar
Assistant Examiner—James R. Bidwell
Attorney, Agent, or Firm—Cushman, Darby & Cushman

[57] ABSTRACT

A skirt seal impact bracket for supporting a conveyor belt idler which improves the impact characteristics of a suspension type idler by enabling the idlers to yield under the force of material being loaded thereonto and thereby protects the idler from undue stress and extends the life of the same. The skirt seal bracket includes a mounting assembly for the bearings of the first and second ends of a belt conveyor idler so as to allow arced pivoting of each bearing of the idler about a point substantially corresponding to a contact point of a trough skirt seal and a belt conveyed by the idler. In this manner, downward movement of a central portion of the idler in response to a load impinging thereon causes the pivoting of each of the bearings about the point of contact of the trough skirt seal and the belt. Further, a structure for limiting such pivoting and downward movement is provided. Finally, a configuration for urging the idler to return toward a pre-loaded position is provided for returning the idler following such impact.

10 Claims, 4 Drawing Sheets

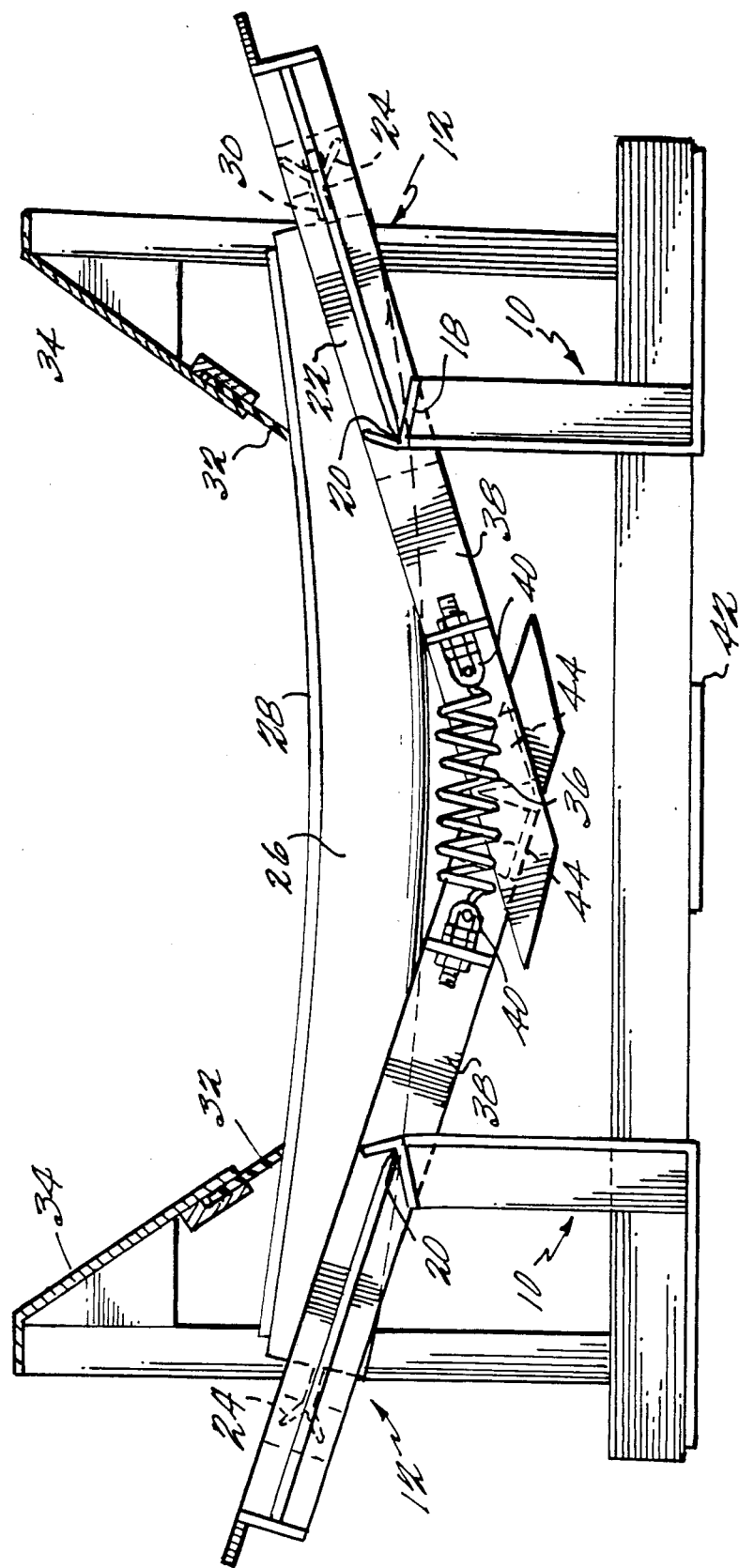
F I G. 1

4,848,540

SKIRT SEAL IMPACT BRACKET

FIELD OF THE INVENTION

The present invention relates to belt conveyors and, more particularly, to a bracket assembly for a suspension type belt conveyor idler that yields to loading impacts while maintaining a material seal between the belt and the loading skirt.

BACKGROUND OF THE INVENTION

Belt conveyors which are used for conveying coal, gravel, dirt and the like are typically in the form of an elongated belt which is suspendingly supported by a number of idlers that allow the belt to be smoothly conveyed with materials disposed thereon. Such belt idlers are typically of the type sold under the Limberoller registered trademark. The Limberoller® troughing idler consists of a steel wire rope that is completely encapsulated in rubber. The elastomer is molded to the rope under heat and pressure so that a sheet of rubber completely covers the rope in the configuration of a molded rubber jacket. Troughing idlers of the Limberoller® design utilize only two bearings per idler, one bearing being located at each end of the central shaft. The troughing idlers are suspended from the end bearings so as to form a catenary that supports the conveyor belt in a uniform manner. As the belt moves over the idler, the friction between the belt and the rubber causes the idler to revolve on its axis.

While the idlers described above have been used for a number of years to advantageously support belts of belt conveyors, it has been found that the stationary, pivotal bracket mounting assemblies for such Limberollers® have the disadvantage that they are incapable of giving under the vertical load of materials added to the belt conveyor. More particularly, at a loading location along the belt conveyor, a trough is typically formed by upwardly extending trough side members so as to guide material added to the belt conveyor system toward the center of the belt. The lowermost edges of such trough sides typically have an elastomeric lip or skirt mounted thereto with, for example, a bracket to contain materials loaded onto the belt. The materials are dumped into the trough from another conveyer belt or some other material transporting device and fall therethrough to the belt surface. When the materials are added to the belt in this manner, they are sometimes dropped from a height which is necessarily substantially above the belt and thus the belt conveyor system is exposed to a substantial downward force. Inasmuch as the statically, rotatably mounted Limberollers® and the like yield only minimally under such vertical loads, repeated loading impacts can damage the rollers and their bearings.

In an effort to minimize the load impact per roller or per bearing assembly, the number of rollers provided per unit length under and adjacent the material adding trough is typically increased several fold so as to distribute the impact stresses of the vertical load. This decreases the likelihood of idler failure. However, increasing the number of rollers is expensive, often structurally difficult and does not effectively absorb loading impacts since loading is generally along only a small length of the belt and, thus, only a few idlers can be mounted thereunder.

It would therefore be desirable to mount conveyor belt troughing idlers, at least at the loading trough region of the belt, so that the roller can yield under vertical loads and thereby absorb such loads while maintaining the proper support of the belt and maintaining an effective seal between the belt and the skirt portion of the trough.

SUMMARY OF THE INVENTION

It is an object of the present invention to provide a support bracket for supporting a suspension type conveyor belt idler which improves the impact characteristics thereof so as to yield under the impact force of material being loaded and thereby protect the idler from undue stress and extend the life of the idler, belt and supporting equipment. Accordingly, repairs and maintenance of the belt, idlers and supporting equipment is reduced. It is a further object of the present invention to provide such a support frame for conveyor belt carrying idlers wherein the seal is maintained between the elastomeric type skirt and the conveyor belt so that material spillages at the loading site can be minimized.

These and other objects of the present invention are provided by a skirt seal impact bracket including means for mounting the bearings of first and second ends of a belt conveyor idler so as to allow movement of each bearing of the idler through an arc of a circle having a center in a vertical plane substantially coincident with a vertical plane through a contact point of a trough skirt seal and a belt conveyed by the idler and to allow downward movement of a central portion of the idler in response to a load impinging thereon, and means for returning the idler toward a pre-load position following such impact. Further advantageous features of the invention are realized by providing a means for limiting the downward deflection of the idler in response to a vertical load and a return device which dampens the downward movement to thereby absorb more of the vertical energy. Further means for stopping the return of the idler toward a preload position are preferably provided so that over-return is prevented.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like reference numerals designate corresponding parts in the various figures.

BRIEF DESCRIPTION OF THE DRAWINGS

FIG. 1 is a front elevational view of a skirt seal impact bracket for supporting a conveyor belt idler formed in accordance with the present invention, before material impact;

DETAILED DESCRIPTION OF THE PRESENTLY PREFERRED EXEMPLARY EMBODIMENT

Figure 2:
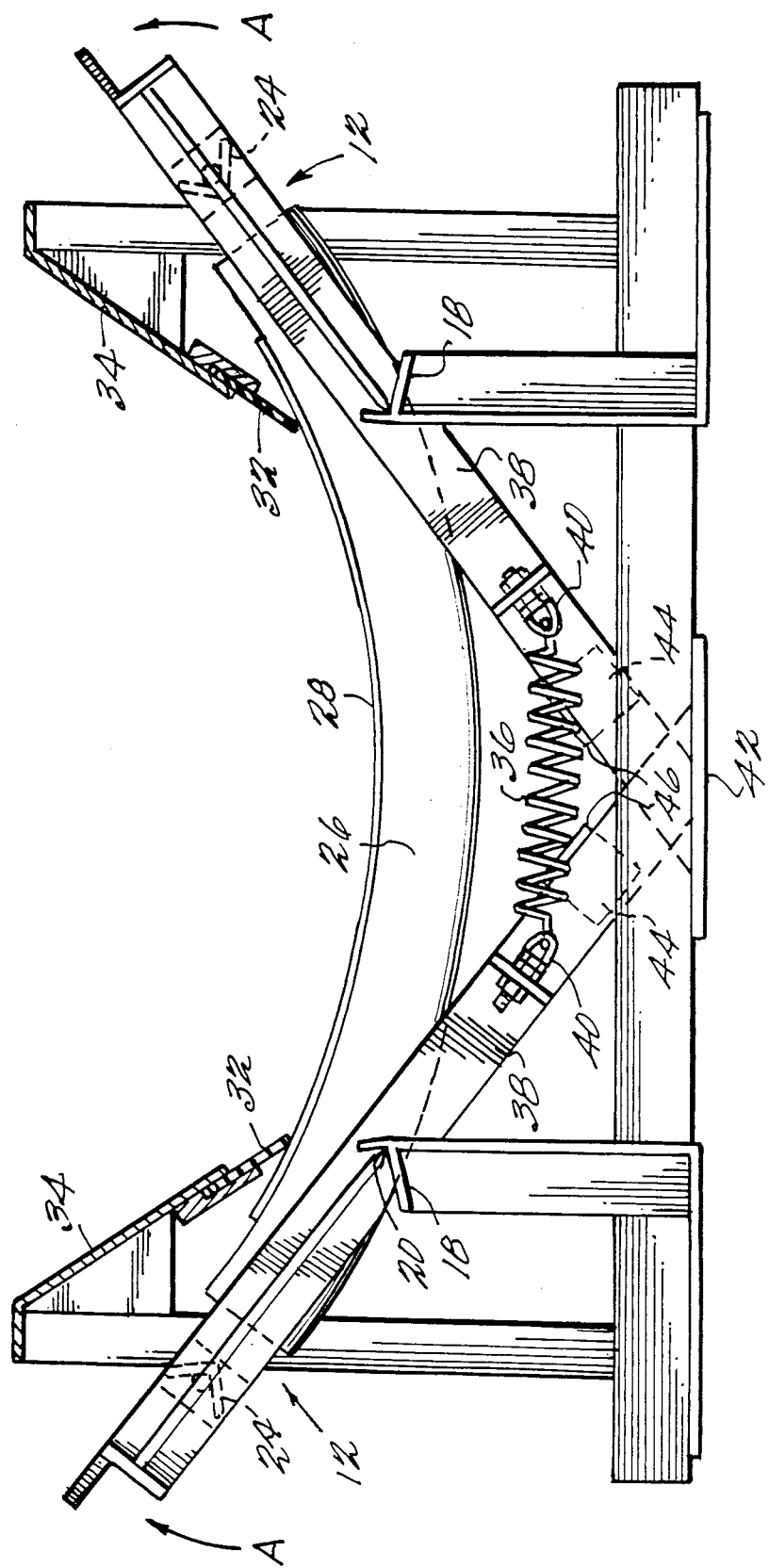
FIG. 2 is a front elevational view of the impact bracket after material impact.
Figure 3:
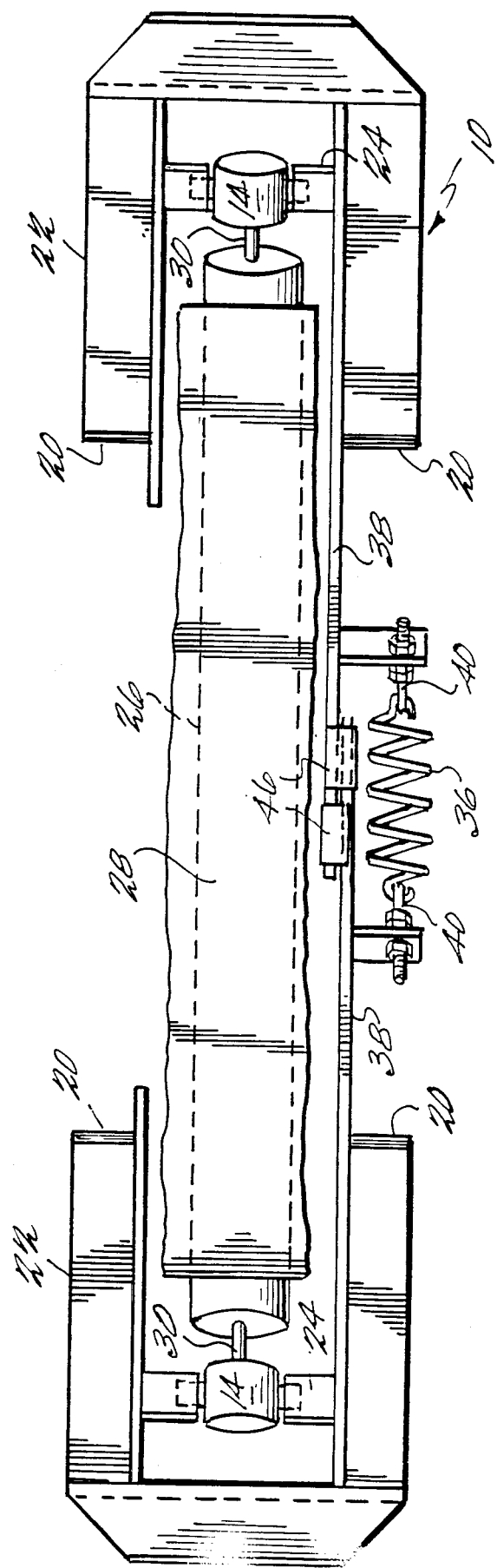
FIG. 3 is a top plan view of the impact bracket of FIG. 1, with parts omitted for clarity.
Figure 4:
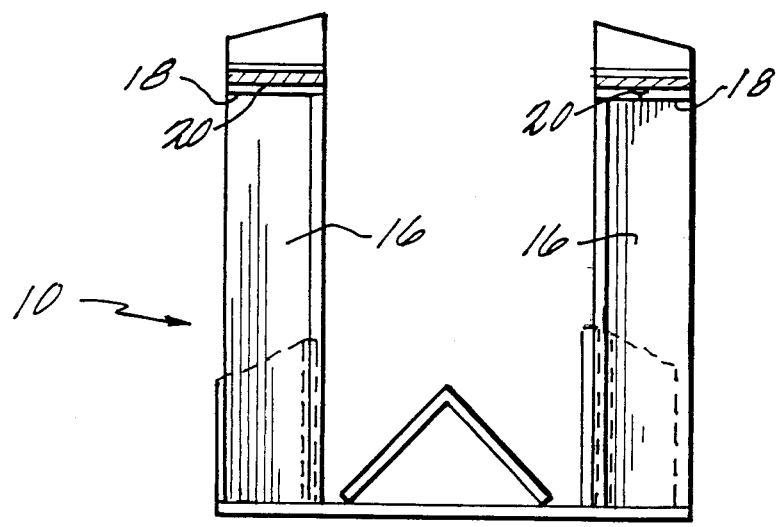
FIG. 4 is a side elevational view of the impact bracket support of the present invention taken from the right of FIG. 1, with parts omitted for clarity.

Referring to FIGS. 1, 2 and 4 in particular, the impact bracket of the present invention includes vertical support structures 10 at each end thereof to which a bearing support structure 12 for pivotally mounting a belt conveyor idler bearing 14 is pivotally mounted. More particularly, each end of the impact bracket has first and second vertical supports 16 which terminate vertically upwardly in a V-shaped knife bearing member 18 which, in turn, receives a knife edge 20 of a substantially U-shaped idler bearing support 22. The U-shaped idler bearing support 22 includes V-shaped trunion mounting members 24 which form a transverse bearing axis for an end bearing 14 of idler 26. In this manner, pivotally mounted bearing 14 of idler 26 is, in turn, pivotally mounted to the vertical supports 16 which allow the movement of each end of idler 26 through a vertical arch, as described more fully below. Of course, it is to be understood that another means for pivotally mounting the U-shaped support 22 for end bearing 14 of idler 26 could be provided. Likewise an idler bearing support having a configuration other than the illustrated U-shape could be provided. However, it is contemplated that a U-shaped support with a knife edge bearing will not only simplify the manufacture and assembly of the impact bracket, but advantageously enables free pivoting because of the minimal frictional contact between the pivoting parts. Therefore, a knife point bearing as illustrated is the preferred pivotal structural mounting.

Because the U-shaped supports 22 are pivotally mounted, when a load is dropped onto a belt 28 conveyed by belt conveyor idler 26, the downward force on the central portion of idler 26 will tend to pull end bearings 14 of idler 26 downwardly and inwardly along cable 30 of idler 26. However, because idler end bearings 14 are mounted a fixed distance from knife bearing 18, the downward force on the central portion of idler 26 will tend to pivot the U-shaped support 22 of the impact bracket upwardly through an Arc A (see FIG. 2), thereby allowing the central portion of idler roller 26 to bow downwardly in response to the load applied thereto. Because of the placement of knife bearing 18, however, the seal between the seal skirt 32 of the trough wall 34 and belt 28 is maintained despite the downward movement of the idler central portion and pivoting of the end bearings.

The downward force from the load is absorbed, as idler 26 moves downwardly in the above manner, by the expansion of a resilient spring 36. More particularly, each of U-shaped bearing supports 22 provided at each end of the impact bracket includes an extension bar member 38, each of which includes suitable mounting means 40 for a spring 36 or the like. Thus, spring 36 interconnects extension bar members 38. As end bearings 14 of idler 26 move upwardly through Arc A and U-shaped member 22 pivots about knife bearing 18, extension bars 38 of each U-shaped support 22 pivots so that its end moves downwardly and stretches the string disposed between the same. Thus, the spring absorbs the energy of the impact.

As can be seen, damage to the parts under excessive loads is avoided by providing elastomeric blocks or pads 42 under extension bars 38 which the bars engage under unusually great loads. While pads 42 inherently absorb energy, it is contemplated that these pads should be provided for limiting movement of arms 38 in response to extremely great impacts rather than normal impact absorption. In this manner the parts of the impact bracket, such as the spring, for example, will not be over-extended or damaged when an unusually heavy load strikes the belt.

Immediately following such stretching and energy absorption by the spring 36, spring 36 will tend to retract to its steady state position, thereby pulling extension bars 38 upwardly toward one another to return idler 26 toward its unloaded steady state support position. Thus, the vertical load of the materials being dropped to conveyor belt 28 is first absorbed by spring 36 and then dissipated by again lifting belt 28 with the material thereon toward a steady state position. Over-return is prevented, however, by providing stops 44 on each of the extension bar members. In the preferred embodiment, an L-shaped stop 44, for example, is mounted to each extension arm 38 so that as spring 36 draws arms 38 together and upwardly, over-return, which is evidenced by the longitudinal bar members 38 passing one another in an upward direction, is prevented by the engagement of each extension arm with the horizontal portion 46 of the L-shaped stop 44 mounted to the other arm.

While in the illustrated embodiment a single spring mounted between single longitudinal extensions of the U-shaped support has been shown for absorbing vertical loads and returning the idler and belt toward a steady state position, it is to be understood that where the idler is exposed to heavier loads, such extension members and impact absorbing springs can be provided on each side of the idler support structure. Likewise, such an impact absorbing structure could be mounted beneath the idler. Even further, in environments wherein it is difficult or impossible to provide such an impact absorption and return structure on either side of or below the idler, it is contemplated that such an impact absorbing returning spring could be mounted intermediate each U-shaped support structure and the base of the vertical supports to thereby absorb impact and return the idler to its steady state position. In the alternative a weight could be mounted to each of the U-shaped supports for limiting downard deflection and for urging the idler toward a steady-state position. The manner in which such modifications of the illustrated structure could be made will be readily appreciated by the ordinary artisan upon a review of the above description of the illustrated embodiment.

Furthermore, while in the the illustrated embodiment the spring is provided for absorbing vertical loads and returning the idler towards its pre-load disposition, it is to be understood that other impact absorbing and returning structures such as, for example, a hydraulic cylinder could be provided so that a dampening of the downward force of impacts could be ensured. In this manner, the likelihood of damage to the impact bracket, the conveyor belt or the idlers can be further minimized.

While the invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A skirt seal impact bracket comprising:
   means for mounting first and second end bearings of first and second ends of a belt conveyor idler so as to allow movement of each said bearing through an arc of a circle having a center in a vertical plane which is substantially coincident with a vertical plane through a contact point of a trough skirt seal and a belt conveyed by said belt conveyor idler and to allow downward movement of a central portion of the idler in response to a load impinging on the belt conveyed by the idler;
   means for limiting the downward movement of the central portion of the idler; and
   means for urging the idler towards a pre-load position following such impact and downward movement.

2. An impact bracket as in claim 1, wherein said means for limiting include at least one elastomeric pad for engaging a longitudinal extension of each said means for mounting, respectively, to limit the arched pivoting of each bearing of the idler.

3. A bracket as in claim 1, wherein said means for mounting the bearings comprise first and second substantially U-shaped support members including a trough element for pivotally receiving a bearing of said idler, each said substantially U-shaped support member being pivotally mounted to first and second vertical supports mounted so as to be disposed on either longitudinal end of the idler whereby vertical impact load on a central portion of the idler will cause each said U-shape support member to pivot about said pivotal mounting to said vertical supports so that each said end bearing is conveyed through an arc of a circle having a center in a vertical plane which is substantially coincident with a vertical plane through a contact point of a trough skirt seal and to allow downward movement of a central portion of the idler in response to a load impinging on the belt conveyed by the idler.

4. An impact bracket as in claim 3, wherein each said U-shaped member includes a longitudinal extension bar member on at least one side thereof such that an extension bar member from said first U-shaped support element is disposed in crossing relation to an extension bar member of said second U-shaped member, each said longitudinal extension member including means for mounting a spring; said bracket member further including a spring element mounted to said means for mounting a spring and extending between said first and second extension bar members such that a force of impact on a central portion of the idler which causes pivoting motion of each of said U-shaped supports results in a pivoting of each said longitudinal extension member thereby extending said spring means which in turn absorb the force of impact and thereby provides a said means for limiting and such that return of said spring to a steady state position urges said longitudinal bar members upwardly to thereby return said bearings towards a steady state position and return said idler toward a steady state position thereby providing a said means for returning.

5. An impact bracket as in claim 1, wherein said means for mounting the bearings comprise first and second support members including means for pivotally receiving a bearing of said idler, each said support member being pivotally mounted to first and second vertical supports mounted so as to be disposed on either longitudinal end of the idler, said means for pivotally receiving a bearing of said idler being define in a vertical plane which is laterally offset from a vertical plane of said respective vertical support, the vertical plane of said respective support being coincident with said the vertical plane through said center point of the arched movement of each said bearing.

6. A suspension belt conveyor idler system comprising:
   at least one conveyor belt idler having first and second longitudinal ends;
   first and second end bearings mounted respectively to said first and second longitudinal ends of said idler;
   a conveyor belt disposed on said conveyor belt idler and supported by said conveyor belt idler;
   a material loading trough including first and second trough side members mounted so as to be disposed above said conveyor belt for guiding material onto said belt towards a central portion of said belt, said trough side members each including a skirt seal element along a lowermost edge thereof for engaging said belt to contain material loaded onto said belt and to thereby minimize spillage from said belt;
   means for mounting said first and second end bearings of a said conveyor idler so as to allow movement of each said bearing through an arc of a circle having a center in a vertical plane which is substantially coincident with a vertical plane through a contact point of a trough skirt seal and a belt conveyed by said belt conveyor idler and to allow downward movement of a central portion of the idler in response to a load impinging on the belt conveyed by the idler and loaded through said through;
   means for limiting the downward movement of the central portion of the idler; and
   means for urging the idler towards a pre-load position following such impact and downward movement.

7. A conveyor belt system as in claim 6, wherein said means for limiting include at least one elastomeric pad for engaging a longitudinal extension of each said means for mounting, respectively, to limit the arched pivoting of each bearing of the idler.

8. A conveyor belt system as in claim 6, wherein said means for mounting the bearings comprise first and second substantially U-shaped support members including a trough element for pivotally receiving a respective bearing of said idler, each said substantially U-shaped support member being pivotally mounted to first and second vertical support mounted so as to be disposed on either longitudinal end of the idler whereby a vertical impact load on a central portion of the idler will cause each said U-shaped support member to pivot about said pivotal mounting to said vertical support so that each said end bearing is conveyed through an arc of a circle having a center in a vertical plane which is substantially coincident with a vertical plane through said contact point between said skirt seal and the belt conveyed by said idler.

9. A system as in claim 8, wherein each said U-shaped member includes a longitudinal extension bar member on at least one side thereof such that an extension bar member from said first U-shaped support element is disposed in crossing relation to a extension bar member of said second U-shaped member, each said longitudinal extension member including means for mounting a spring; said bracket member further including a spring element mounted to said means for mounting a spring and extending between said first and second extension bar members such that a force of impact on a central portion of the idler which causes pivoting motion of each of said U-shaped supports results in a pivoting of each said longitudinal extension member thereby extending said spring means which in turn absorb the force of impact and thereby provides a said means for limiting and such that return of said spring to a steady state position urges said longitudinal bar members upwardly to thereby return said bearings towards a steady state position and return said idler toward a steady state position thereby providing a said means for returning.

10. An impact bracket as in claim 6, wherein said means for mounting the bearings comprise first and second support members including means for pivotally receiving a bearing of said idler, each said support member being pivotally mounted to first and second vertical supports mounted so as to be disposed on either longitudinal end of the idler, said means for pivotally receiving a bearing of said idler being define in a vertical plane which is laterally offset from a vertical plane of said respective vertical support, the vertical plane of said respective support being coincident with said the vertical plane through said center point of the arched movement of each said bearing.

* * * * *